UNITED STATES PATENT OFFICE.

AUGUST MARSCHALL, OF NEW YORK, N. Y.

IMPROVEMENT IN THE PROCESSES OF RECOVERING MALT FOR FOOD FOR CATTLE, &c.

Specification forming part of Letters Patent No. 150,769, dated May 12, 1874; application filed March 18, 1874.

*To all whom it may concern:*

Be it known that I, AUGUST MARSCHALL, of New York, in the county of New York and State of New York, have invented a new and Improved Recovered Malt, of which the following is a specification:

This invention has for its object to restore to useful application the malt which is used in breweries after having been subjected to the mashing process. Such malt is at present entirely discarded and thrown away, or at times it is used as food for cattle; but as such it can only be utilized within, say, twenty-four hours after it leaves the mashing-tub, because it will ferment after that time, and, moreover, its great weight, when it leaves the brewery, makes it expensive to transport, and, therefore, of still less value.

Now, I intend to restore the malt, which is at present almost a useless and in many cases even a dangerous article, because its exhalations, when dumped away from the breweries, are exceedingly injurious to health, to useful and profitable purpose. I know that many attempts have heretofore been made to remove the moisture from the spent malt of breweries, but never have these attempts been successful. Presses have been used for this purpose of drying — that is to say, the moisture was squeezed out of the spent malt—and with it also all nutritious substances, so that the dry remainder was of no actual use as an article of food. When heat was applied to the drying of the malt it was usually the case that the latter was burned, or at least scorched or smoked.

My invention will do away with all of these objections, and it invariably produces a superior article for the trade, which can be utilized either as food for cattle, being in a condition to be preserved for a long time, or as a fertilizer for the soil, or for other suitable purpose. I dry the spent malt of the breweries in an apparatus wherein it is subjected to continuous currents of warm air having a temperature of about 200° Fahrenheit, such apparatus forming the subject-matter of another application for a patent which has been filed by me at the same time with the present. In said or equivalent apparatus the spent malt is, as stated, exposed to currents of dry air, and the moisture in it contained is completely absorbed by the air without taking with it in its ascent any of the nutritious or fertilizing matter contained in the spent malt. The residue of the drying process will be a substance composed of barley-shells and of some of the flesh still contained within the shells in a dry condition. This substance can be preserved for any length of time, and will, therefore, constitute an admirable winter fodder for farmers, being cheap and exceedingly nutritious. It will also, when properly used, constitute a fertilizer of great value, as it returns to the soil many of the ingredients necessary for forming a new crop. In every respect, therefore, will the invention be useful, as it restores to the trade a substance which was heretofore useless, even dangerous, and does away with a nuisance that up to the present time followed in the wake of every brewery.

I claim as my invention—

The process herein described of recovering spent malt by subjecting it to currents of dry warm air, as described.

AUG. MARSCHALL.

Witnesses:
A. V. BRIESEN,
MICHAEL RYAN.